3,029,209
POLYURETHANE FOAMS FILLED WITH ORGANO-PHILIC KAOLIN CLAY AND METHOD FOR MAKING SAME
Thomas H. Ferrigno, Metuchen, N.J., assignor to Minerals & Chemicals Philipp Corporation, a corporation of Maryland
No Drawing. Filed Aug. 12, 1959, Ser. No. 833,145
12 Claims. (Cl. 260—2.5)

The present invention relates to the class of polyurethane cellular plastics characterized by an open or intercommunicating cell structure.

One of the most outstanding advances in the plastics industry during the past decade has been the development of polyurethane foams which are cellular plastic materials formed by the reaction of long chain polyol compounds and organic polyisocyanates. Cellular plastics are available in various degrees of rigidity, ranging from soft, flexible foams useful in cushioning, clothing interliners, rug underlays, sponges and bath mats; semirigid foams, useful particularly as crash pads; and rigid foams for structural and insulation purposes. The final properties of the urethane foams depend principally on the choice of polyester, polyethers or other long chain polyhydroxyl compound which is converted by the polyisocyanate into a high molecular weight polymer which is then foamed by a suitable foaming system, usually by reaction of water with the free isocyanato groups in the polymer, resulting in the formation of carbon dioxide which expands the resin into the desired cellular plastic. The control of branching in the reactants permits an extremely wide range of properties in the final foamed plastic. The density of the foam is controlled to a great extent by the amount of water employed. The configuration of the cell depends principally on the equivalent weight of the long chain polyhydroxyl reactant, with the lower equivalent weight polyhydroxyl materials favoring the production of a closed cell structure and the higher equivalent weight polyhydroxyl materials leading to the open cell structure. The degree of branching of the polyhydroxyl reactant also influences the cell character.

The flexible and semirigid foams are processed for the aforementioned applications in a manner such that the foam has a low density, usually from about 1.25 to 4 lbs. per cubic foot, and preferably as low a density as is consistent with the provision of a product of adequate strength, etc. Moreover, such flexible and semirigid foams should have an open celled structure for most applications, which is to say that essentially all (i.e., at least about 90%), of the cells are intercommunicating since such a foam configuration is essential to the realization of acceptable foams for cushioning, clothing interliners, crash pads or the like. Rigid foams, in contradistinction, may have varying density values ranging up to 30 lbs. per cubic foot or higher, and usually have a closed cell structure.

Many advances have been made in the field of polyurethane chemistry with a view to improving processing techniques and the properties of the ultimate foamed product. Despite the refinements in processing and reduced cost of raw materials, a serious drawback to the use of polyurethane foams is their high cost which reflects particularly the expense of the polyisocyanate reactant. An obvious expedient for lowering the cost of polyurethane foamed products would be to extend the foam produced by a unit of prepolymer with low cost filler materials, such as are extensively used in other plastic applications. Such a filler, to truly extend the foam volume, should increase the volume of foam produced by foaming the prepolymer by at least that foam volume produced by foaming a volume of liquid prepolymer equivalent to the volume of extender used. At any rate, the ultimate foam density of the filled foam should not be much greater than that of the unfilled foam since foams are generally employed on a volume basis and increase in foam density increases the cost of foam required for a particular application. Moreover, the use of the filler should not adversely affect other physical properties, such as compression set, deflection, tear strength and cell structure.

The open cell flexible and semirigid foams are commercially prepared without fillers. Certain finely divided inorganic materials have been advocated for imparting special properties, such as shrink resistance, improved compression set and increased density to various types of polyurethane foams. However, in the case of the low density open celled polyurethane plastics, it has been found that fillers adversely affect density and cell structure when incorporated in the foamable polyurethane composition in appreciable quantity such as 10% by weight or more. For example, fine silica, viz., silica finer than 1 micron and particularly silica finer than 0.015 to 0.020 micron, is used in small quantities in the production of some low density polyurethane foam compositions for the purpose of improving the compression set or reducing shrinkage of the foamed product. However, greater quantities of such silica cannot be incorporated in the foam structure inasmuch as the resultant foam will be too dense and have poor texture. Similar effects are noticed when filler grades of other minerals are included in foamable polyurethane formulations. Thus, fine filler grades of kaolin clay markedly increase the density of the normally open celled low density polyurethane foam when incorporated therein in appreciable amount, usually causing nonuniformity in the cell structure and loss of mechanical strength; in many cases, use of such clay, as well as other filler, causes complete or partial collapse of the foam. Thus, such kaolin clay, etc., fails to function as a foam extender.

Accordingly, an object of the present invention is to provide low density open celled polyurethane foam compositions containing inorganic filler material which will overcome the aforementioned difficulties.

Another object of the invention is to provide open celled low density polyurethane foam compositions containing a finely divided inorganic solid as a filler therefor, which compositions possess characteristics such as: reduced cost, as a result of an increase in foam volume provided by foaming a unit of polyurethane polymer; physical properties as good or better than the unfilled foam compositions; and excellent stability and compression characteristics.

These and further objects and features of my invention will be readily apparent from the description thereof which follows:

I have discovered, in connection with the provision of light weight, open celled foamed polyurethane plastics from polyurethane prepolymers, that important unexpected results are realized by utilizing as the filler kaolin clay, particularly fine fractionated grades of kaolin clay, the particles of which are coated with certain organic cationic materials of a class hereafter set forth.

Briefly stated, my invention contemplates the incorporation of kaolin clay in an open celled polyurethane foam made from a liquid polyurethane prepolymer, the kaolin clay being substantially free from grit (namely, particles coarser than 44 microns or 325 mesh) and having a particle size distribution such that the content of material coarser than 0.80 micron is limited to not more than about 50% by weight, the particles of the clay being uniformly coated with an organic cationic material selected from the group consisting of alkyl amines containing a trivalent nitrogen atom and having from 6 to 22 carbon atoms, mineral acid salts thereof and alkanoic acid salts thereof wherein the alkyl group contains from 1 to 17 carbon atoms. The organic cationic material is coated on the clay in amount to render the normally hydrophilic clay organophilic.

The polymeric urethane plastic in which the kaolin clay is distributed is one formed by foaming a liquid prepolymer which is the reaction product of a polyisocyanate and at least one long chain substantially linear polyhydroxyl compound, the polyhydroxyl compound being one which normally (i.e., in the absence of the kaolin) produces an open celled cellular product when reacted with said polyisocyanate employing a suitable foaming system.

I am well aware that the reaction products between bentonite clay and certain long chain amines containing at least 26 carbon atoms and in which the nitrogen is in pentavalent state, have been suggested in U.S. Patent No. 2,634,244 to Simon et al. as foam stabilizers for polyurethane foams prepared from branched polyesters. However, the prior art teaches that such foamed plastics formulated with quaternary ammonium bentonite complexes are rigid, dense, closed-celled foams in contradistinction to the flexible or semirigid, light weight open-celled foams of my invention and the highly branched polyesters used in the preparation of those foams are exclusive of the linear high equivalent weight polyols I employ. Moreover, the kaolin clay I employ has a low base-exchange capacity, in contrast to bentonite which has a high base-exchange capacity, and is otherwise different in chemical and physical properties from bentonite, as is well known to those skilled in the art.

Furthermore, I coat the clay with an amine containing nitrogen in its trivalent state, rather than an amine containing nitrogen in its pentavalent state, as taught by the prior art. The coated clays useful in the practice of my invention do not swell in organic solvents as do the base-exchanged bentonites. It will be thus readily appreciated that the present invention represents a radical departure from prior art teachings in terms of materials utilized and results realized.

An important feature of my invention is that the fine fractionated kaolin clay I employ as a polyurethane foam extender cannot, in uncoated condition, be incorporated satisfactorily in the foamed polymer in that it shows indications of reactivity with polyisocyanates and will adversely affect the foam density and frequently prevent development of foam from the prepolymer. I have observed the phenomenon that coarse fractionated kaolin clay which, unlike fine kaolin clay, is normally capable of being employed as an extender for such foams, is not benefited by precoating the clay particles prior to their incorporation into the foamable polyurethane prepolymer.

Microscopic studies of foams formulated with the amine-coated kaolin clay as taught herein indicate a fine, uniform open-celled foam structure similar to that produced in the absence of the filler but characterized by somewhat thinner cell walls.

A general characteristic of the amine-coated kaolin extended open-celled polyurethane foams is their more rigid character as compared with an unextended foam based on the same prepolymer. The extended foams I produce utilizing the amine-coated kaolin clay filler are of the semirigid type, useful particularly for crash pad installations. The density of the filled foams is low and does not exceed appreciably that of the unfilled foams. An important benefit of utilizing many of the amine-coated kaolins as polyurethane foam fillers is that the compression set characteristics of the foam is significantly improved from what it would be in the absence of the coated kaolin. Another important benefit of utilizing the amine coated kaolin as a filler is that the cost of a unit volume of foamed urethane plastic is reduced in that the coated clay increases the foam volume developed from a given volume of liquid polyol and polyisocyanate reactants by an amount at least equal to the foam volume that would be developed by a volume of liquid polyol and polyisocyanate reactants equivalent to the volume of the clay used in the preparation of the product. In other words, the volume of the clay filled foamed plastic composition of my invention is at least equal to the sum of the volume of the foamed reaction product of the liquid polyol-polyisocyanate ingredients in the absence of the kaolin clay plus the foam volume produced in the absence of the clay by a volume of polyol polyisocyanate prepolymer equivalent to the volume of amine-coated kaolin clay used in the formulation.

Kaolin clays are hydrous aluminosilicates of the approximate empirical formula $Al_2O_3 \cdot 2SiO_2 \cdot 2H_2O$ and are composed of the mineral kaolinite. Kaolin clay is not, however, limited to clays composed of the single mineral kaolinite since certain kaolin clays are composed of the minerals nacrite, dickite and anauxite, all of which are characterized by the formula given above. Halloysite, of which there are two varieties differing from each other in the amount of water of hydration, is also encompassed by the term "kaolin clay."

Mined kaolin clays are customarily refined for industrial usage by removing abrasive grit, as exemplified by material which is plus 325 mesh (44 microns). These refined clays frequently have particle size distributions such that usually 50% or more and sometimes 80% or 90% by weight, consists of particles under 2 microns in equivalent spherical diameter and the average equivalent spherical diameter (i.e., the equivalent spherical diameter of 50% by weight of the particles) is typically about 1.5 microns. The clay I employ is fine fractionated kaolin clay which is produced from raw kaolin by substantially removing grit, i.e., material coarser than 44 microns, and separating from the degritted kaolin a sufficient quantity of the coarser kaolin particles, by any of the numerous methods well-known to those skilled in the art, to provide a fine degritted kaolin product having a particle size distribution such that substantially all is finer than about 44 microns, and at least about 80% by weight consists of particles having an equivalent spherical diameter less than 2 microns and at least about 50% consists of particles finer than 0.80 micron. Degritted whole clay of such particle size distribution may be used when available. Thus, the kaolin clay I employ is a degritted clay having a particle size distribution such that not more than about 20% by weight consists of particles larger than 2 microns and not more than about 50% by weight is coarser than 0.80 micron. The average equivalent spherical diameter of the particles (i.e., the equivalent spherical diameter of 50% by weight of the particles) is less than 0.80 micron and is usually about 0.55, although it may be as low as 0.25 micron.

For the purpose of the present invention the particle size distribution of kaolin clay is determined by the Casagrande sedimentation method described in Journal of the American Ceramic Society, vol. 21, pages 89–97 (1938).

The organic cationic material I employ to coat the fine kaolin clay may be a primary, secondary or tertiary amine or amine salt with branched and/or straight chain alkyl groups, such amines having a total of from 6 to 22 carbon atoms and containing nitrogen in trivalent state. The use of primary n-alkyl amines and their salts is preferred because of their relative cheapness, ready availability and their outstanding performance. Representative of suitable amines are hexylamine, octylamine, decylamine, dodecylamine, N-N-dimethyl octylamine, N-ethyl decylamine.

Preferred organic cationic coating materials for the clay are the primary straight chained alkyl amines having from 6 to 8 carbon atoms; such coated kaolin and its preparation are disclosed and claimed in a copending U.S. patent application of Serial No. 779,255, filed November 24, 1958, by James R. Wilcox, which is a continuation-in-part of U.S. patent application of Serial No. 521,754, filed July 13, 1955, by James R. Wilcox, now abandoned.

The modified kaolin clay useful in the practice of my invention is one preferably coated with certain alkanoic acid salts of amines, rather than the amines themselves. Good results are realized with alkanoic acid salts having from 1 to 17 carbon atoms in the alkyl group, e.g., acetic acid, propionic acid, butyric acid, valeric acid, enanthic acid, caprylic acid, lauric acid, myristic acid and stearic acid. The preferred amine salt coating agents from the standpoint of economy and availability are primary straight chain alkyl amine acetates having 6 to 8 carbon atoms in the alkyl chain, for example octylamine acetate. In addition to alkanoic acid salts of amines I may employ mineral acid salts of the amines, e.g., the chloride, sulfate and phosphate salts.

About 1%, based on the dry weight of the clay, is the preferred quantity of amine or amine salt for use in coating the kaolin in preparing the filler useful in the preparation of the foamed plastic compositions of my invention. Higher or lower proportions of the amines and their salts can be used, however, within the scope of my invention, e.g., kaolin clay coated with as little as about 0.1%, based on the dry clay weight, and up to about 4.0%, same basis, may be used. The only requirement with regard to quantity of the amine is that it should be present in amount to render the kaolin clay organophilic.

The kaolin clay is preferably coated with the amine by passage through a fluid energy type mill, although other procedures well known to those in the art can be used. Since the efficacy of the amine coating depends on the uniformity of its distribution on the surface of clay particles, the method must provide for such uniform coating. As examples of suitable methods alternative to fluid energy milling may be cited ball milling or procedures involving drying and then grinding an aqueous slurry of kaolin clay to which a suitable amine has been added.

The amount of amine-coated kaolin clay to be used in the preparation of the foamed plastic composition may vary over a relatively wide range with the maximum clay content being dictated primarily by the viscosity of the foamable polyurethane prepolymer into which it is incorporated, since the viscosity of the prepolymer will limit the quantity of filler that can be uniformly mixed therein. In general, the coated clay is used in amount within the range of from about 5% to about 40%, based on the weight of the polyurethane prepolymer and is more usually used in an amount between 7.5% and about 15%, same basis.

The foamable polyurethane prepolymer I employ is one that is normally a liquid and is preferably one that has as low a viscosity under ambient conditions as is consistent with the provision of an ultimate foamed plastic of acceptable physical properties. The prepolymer contains free isocyanato groups in excess of those required to react with the hydroxyl groups of the polyol employed in the preparation of the prepolymer and with the water employed in the foaming step. The viscosity of the foamable liquid polyurethane propolymer is between about 500 and 75,000 cp., although preferably the viscosity is between about 500 and 50,000 cp. I have found that prepolymers having a viscosity greater than about 75,000 may not be filled with adequate quantities of the coated pigment to influence favorably the cost of the finished product whereas the physical properties of the ultimate foam may be impaired if the viscosity of the prepolymer is lower than about 500 cp. All viscosity values refer to determinations made at 25° C.

Suitable polyurethane polymers are the reaction products of long chain polyols and polyisocyanates, as exemplified by the reaction product of an arylene diisocyanate and a polyalkylene ether polyol, the reaction product of an arylene diisocyanate and a saturated polyester resin containing terminal hydroxyl groups, and the reaction product of an arylene diisocyanate and a fatty acid triglyceride having an hydroxyl number of at least 49. All of the aforementioned polyurethane prepolymers are well known to those skilled in the art and their preparation is amply described in the literature. The reaction products of arylene diisocyanates and polyalkylene ether polyols are particularly useful prepolymers in the practice of my invention because of their low viscosity. Triglycerides having a hydroxyl number of at least 49, e.g., castor oil, may be reacted with arylene diisocyanates, as described in U.S. Patent No. 2,787,601 to form a suitable liquid polyurethane prepolymer. The ratio of triglyceride hydroxyl groups to isocyanato groups in such polyurethane products is from 0.45:2 to 0.95:2. Other liquid polyurethane compositions containing free isocyanato groups and which produce a plastic foam upon reaction with water may be used.

The particular long chain polyol that is used in the foam preparation is one that normally reacts with the polyisocyanate to produce an essentially linear reaction product which, in the presence of a catalyst, is capable of being foamed to provide an open-celled low density cellular polyurethane product. In general, it may be said that suitable liquid long chain polyols have an equivalent weight of at least 200. The term "equivalent weight" as used herein is synonymous with the term "isocyanate equivalent" and is a theoretical value calculated from the hydroxyl and acid values of a polyol according to the formula:

$$\text{Equivalent weight} = \frac{56,100}{\text{Hydroxyl value} + \text{acid value}}$$

A preferred class of polyol, because of its low cost and low viscosity characteristics, is that of the so-called "polyethers" which are polyalkylene ether polyols, the reaction products of alkylene diamines, such as ethylene diamine, or polyhydroxyl compounds such as glycerine, with alkylene ethers such as ethylene oxides, propylene oxide or mixtures of propylene oxide and ethylene oxide. Such polyethers have a functionality of at least 2 and an equivalent weight of at least 200, and typically between 865 and 1333. As examples of suitable commercial polyethers may be cited: "Tetronic 701," which is a condensation product of ethylene diamine and mixed propylene and ethylene oxides, having a functionality of 4 and an equivalent weight of 865; Pluronic L-61, which is prepared from propylene glycol and mixed propylene and ethylene oxides and has a functionality of 2 and an equivalent weight of 1,000; the polyglycol ether from glycerine and propylene oxide having a functionality of 3 and an equivalent weight of 1333, supplied under the trade designation "11-300," and PPG-2025, which is a polypropylene ether glycol from propylene oxide, having the functionality and equivalent weight of Pluronic L-61. Although I prefer to employ polyethers because the low viscosity of polyether-polyisocyanate adducts is conducive to the realization of open-celled urethane foams extended with relatively large quantities of coated inorganic filler material, other polyols may be used, particularly those which have a relatively low degree of branching, equivalent weights usually at least about 200, and are otherwise adapted to produce an open-celled foam.

Another class of suitable polyhydroxyl compounds that may be used is that of saturated polyesters having terminal hydroxyl groups and low acid numbers (usually below 15); these polyesters are made from a dibasic acid, such as adipic acid, or succinic acid and a dihydric alcohol, such as ethylene glycol, or mixtures thereof. The resultant polyesters are liquids of moderate molecular weight, e.g., 1000 to 2500, terminate in hydroxyl groups and function chemically more or less as high molecular weight polyfunctional alcohols inasmuch as they have low acid numbers and are essentially free from the highly branched, viscous or solid polyesters derived essentially from triols and having low equivalent weights and used in producing rigid, closed-celled foams. In addition to polyesters having terminal hydroxyl groups, fatty acid triglycerides having a hydroxyl number of at least 49, e.g., castor oil and derivatives thereof, may be employed as described in U.S. Patent No. 2,787,601. Also useful are dihydroxy triglycerides, which have a lower functionality than the parent triglyceride and a higher equivalent weight, typically about 500–600. The triglycerides, particularly the trihydroxy triglycerides, are usually used in conjunction with the aforementioned polyethers or polyols having a molecular weight below 200, as exemplified by ethylene glycol, trimethylolpropane and polyethyleneglycol. Polyols other than those specifically set forth above may be used provided that they normally are capable of forming an open celled foam with the polyisocyanate.

A large number of polyisocyanates may be used in the preparation of the cellular urethane products, although preferably the aromatic polyisocyanates, which are more reactive and less toxic than aliphatic polyisocyanates are used. At present 2,4-tolylene diisocyanate, 2,6-tolylene diisocyanate and mixtures thereof, are commercially available. However, other diisocyanates may be used with good results when they are available, as examples of which may be cited methylene-bis-(4-phenyl isocyanate), naphthalene 1,5-diisocyanate, and 3,3'-dimethoxy-4,4'-biphenylene diisocyanate.

As is well known to those skilled in the art, the isocyanate is employed in excess of that required to react with all functional groups in the polyol (and to react completely with water, when an aqueous foaming system is employed).

The isocyanato content of the prepolymer is controlled so as to provide more —NCO groups than theoretically required for complete reaction with all water and all functional groups in the polyol. The free —NCO content of the prepolymer is about 5% to 20%, based on the weight of the prepolymer and is usually about 9%. The excess isocyanato groups, which are at the end of the polyurethane chains after the water added to the prepolymer is consumed, can then react with active hydrogen groups, such as urea, urethane, hydroxyl or amide groups within the polymer chain so as to branch linear chains or cross-link branched chains in order that optimum physical properties of the foam may be developed.

The number of free or unreacted isocyanato groups in the polyurethane prepolymer may be determined by adding an excess of n-butylamine and back titrating excess amine with hydrochloric acid.

The amount of water added to the polyurethane prepolymer containing unreacted isocyanato groups to expand the polymer into a cellular plastic will vary with the properties sought in the foamed plastic and is usually within the range of from about 33⅓% to about 95% by weight of the unreacted isocyanato radicals in the polyurethane prepolymer.

Other materials may be added during the formation of the plastic foam from the polyurethane prepolymer to control, for example, the reaction rate and viscosity build-up during reaction. A tertiary amine catalyst, such as for example, pyridine, triethylene diamine, dimethylhexadecylamine, quinoline, triethylamine, or N-methylmorpholine, is employed to accelerate the reaction between the water and isocyanato groups of the prepolymer, as well as to induce crosslinking by reaction of excess isocyanato groups with substituents of the polyurethane. However, other catalyst systems may be employed within the scope of my invention. For example, I may use a combination of a tertiary amine with an organic tin product, such as dibutyl tin diiaurate or dibutyl tin oxide. The tin organic compounds have also been found to be effective in the absence of tertiary amine catalysts.

It will be distinctly understood that modifications of the so-called "prepolymer method" may be employed in the preparation of the kaolin clay extended open-celled foams. All of these methods involve the reaction of an arylene diisocyanate with a long chain linear polyol to form a foamable polyurethane which contains unreacted —NCO groups, and foaming the arylene diisocyanate-polyol adduct in the presence of a catalyst. For example, the isocyanate may be reacted with a portion only of the polyol to provide a polymer having a relatively high —NCO content, e.g., about 30%; the polymer coated filler may be added thereto followed by addition of a mixture of remaining polyol, catalyst, water and surface active agent. In such a case, the total quantity of polyol will be such as to provide about a 9% free isocyanato content in the mixture. Likewise, other foaming systems may be employed. For example, a metal salt hydrate may be employed in lieu of or in conjunction with water. Also, a solvent foaming system, a recent innovation in the polyurethane foam art, may be used. Pursuant to the latter, the polyurethane prepolymer is dissolved in a solvent, the solvent being one which has a boiling point just above room temperature at atmospheric pressure. Catalyst is added and the heat of reaction causes the solvent to vaporize and, as the polymeric structure builds up, the solvent volatilizes, thereby foaming the polymer. A smaller quantity of polyisocyanate is employed in the production of such a composition than when water is employed in the foaming step.

Various other materials may be included in the foam composition of my invention, as examples of which may be cited external plasticizers, such as diesters, used to impart flexibility, coloring agents, emulsifiers and surface active agents. The latter class of materials encompass compounds of a wide variety of ionic character, surface activity, etc. It is well known that the cell size, water resistance, resistance to discoloration and chemicals, compression set, etc., may be controlled to a certain extent by the type and concentration of surfactant.

Following are examples which illustrate the benefits of coating fine fractionated kaolin clay with amines prior to utilizing such clay as a filler for a low density open-celled polyurethane foam prepared from liquid polyurethane prepolymers. It will be clearly understood that the invention is not limited to the particular polyol and diisocyanates or amine coatings and quantities mentioned in these examples, in which all parts are by weight.

In these examples, densities were determined by weighing blocks carefully cut to 2 x 2 x 1 inch. These blocks were then used in the 50% deflection and percent compression set tests. The compression set test was conducted in accordance with ASTM test D-1564-58, Method B, constant deflection. This value represents the percent of the original height of the sample which did not recover in 30 minutes after the sample had been compressed to half its original height for a period of 22 hours at 158° F. The higher values indicate poor resiliency characteristics or loss of resiliency upon aging. The 50% deflection test was conducted by loading a balanced board and tin can on the 2 x 2 x 1 inch specimen and filling the can with bird shot until the one-inch dimension was reduced to ½ inch and remained at this height for 1 minute. The total load was determined and reported as pounds per square inch per 50% deflection.

The data representing foam volume in cubic feet was derived by dividing the total batch weight, in pounds, including that of the extender, by the density of the cured foam. If an increase of foam volume was realized, the effect was due to the extender. It has been mentioned that a filler to be truly an extender for a foamed resin must increase the foam volume developed from a given volume of prepolymer by an amount at least equal to the volume of foam produced by a volume of prepolymer (in the absence of the filler) equivalent to the volume of filler used. Thus, for example, if 100 pounds of an unfilled prepolymer weighing 8.35 pounds per gallon yields 2.53 cubic feet of foam per gallon of prepolymer (or 100 pounds of prepolymer yields a total foam volume of 30.4 cubic feet), then addition of 10 pounds of a mineral filler having a density of 21.5 pounds per gallon and occupying 0.465 gallon, should increase the foam yielded by 100 pounds of the same prepolymer by (2.53 x 0.465) or about 1.20 cubic feet.

EXAMPLE I

This example illustrates that fine kaolin clay, in its natural (viz. uncoated) condition is not a satisfactory filler for a low density open-celled polyurethane foam.

In this example the polyol employed in preparing the polyurethane prepolymer was Niax Diol PPG 2025, which is a linear polypropylene oxide glycol having an equivalent weight of 1000, an hydroxyl number of 56 and weighing 8.35 pounds per gallon.

2200 parts of the polyether was mixed thoroughly and rapidly with 200.2 parts of 2,4-tolylene diisocyanate (1.05 equivalents per equivalent of polyether) under a dry nitrogen blanket in a stainless steel vessel, resulting in an exothermic reaction. The temperature increased to 158° F. after one hour and was maintained at that temperature for about 2¾ hours at which time viscosity was 1500 cp. (as measured at 25° C. on a Brookfield viscometer using the #5 spindle). 539 parts of 2,4-tolylene diisocyanate was added to bring the final —NCO content of the prepolymer to 9% over a period of about an hour holding the temperature at about 158° F. The batch was then poured in cans which were flushed with dry nitrogen gas and sealed.

*Preparation of Foams*

The prepolymer was mixed with polydimethyl siloxane liquid (a wetting agent supplied under the designation "DC 200"), using 100 parts of prepolymer to 0.5 part siloxane. Various kaolin clays were added to fractions of the prepolymer, using 10 parts of clay for each 100 parts of prepolymer, and mixed into the prepolymer for 3 minutes under high speed agitation.

To each fraction containing 10 parts kaolin clay, 100 parts prepolymer and 0.5 part siloxane, a mixture of 2.0 parts N-methylmorpholine and 2.3 parts water was rapidly added and the batch agitated vigorously for 10 seconds and then immediately poured into a closed mold lined with polyethylene film. 15 minutes after the foams reached peak height, the foam and form were placed in a forced draft oven at 158° C. for 15 minutes and the forms removed. All foams were post cured for 4 hours at 176° F.

Following is the particle size distribution of various kaolin clays employed in this example and other examples of my invention.

|  | Percent By Weight Finer Than— | | | | |
|---|---|---|---|---|---|
|  | 35 Microns | 4.8 Microns | 2 Microns | 1 Micron | 0.55 Micron |
| Fine Clay | 100 | 100 | 92 | 72 | 50 |
| Coarse Clay | 100 | 50 | 22 | 10 | 7 |

All of these clays were degritted; the maximum 325 mesh content of ASP 200 was 0.02% and 0.15% in the case of ASP 400.

The percent by weight of these clays lying within certain size ranges is given below:

| Particle Size Distribution, Percent By Weight | Fine Clay | Coarse Clay |
|---|---|---|
| 0-½ Micron | 44 | 4 |
| ½-1 Micron | 28 | 6 |
| 1-2 Microns | 20 | 10 |
| 2-5 Microns | 8 | 31 |
| 5-10 Microns | 0 | 30 |
| 10-35 Microns | 0 | 19 |
| Av. Equivalent Spherical Diameter, Micron | 0.55 | 4.8 |

The density of these clays is 21.5 pounds per gallon; maximum free moisture content was 0.5% (free moisture is the weight percentage of the clay eliminated by heating essentially to constant weight at about 220° F.).

In Table I there is recorded the physical properties of the foamed resins formulated as above-described with the various grades of uncoated kaolin clay described above.

TABLE I

*Physical Properties of Foams Filled With Uncoated Kaolin Clay*

| Filler | Av. Equiv. Spherical Diam. of Filler, Microns | Density, Lbs./Cu. Ft. | Foam Vol., Cu. Ft./ Total Formula | p.s.i/ 50% Deflection | Percent Compression |
|---|---|---|---|---|---|
| None (control) | | 3.29 | 30.4 | .050 | 29.5 |
| Fine clay | 0.55 | 16.7 | 6.6 | | |
| Coarse clay | 4.8 | 3.39 | 32.4 | 0.65 | 21.1 |

The data reported in Table I shows that the fine kaolin clay was unsuitable as a filler in the polyurethane foam in that it increased the density of the foam almost fivefold over that of the control foam which was formulated without an extender, and very markedly decreased the foam volume from that normally produced by a given volume of prepolymer. On the other hand, the coarser kaoline clay increased the foam volume produced by the prepolymer by more than would the same volume of prepolymer.

It was found that in a similar preparation, modified only by a somewhat higher catalyst/water ratio (2.6 to 2) that the use of the same fine grade of kaolin clay in an amount of 10%, based on the prepolymer weight, caused foam collapse, whereas the unfilled foam had satisfactory characteristics.

EXAMPLE II

The characteristics of the foamed prepolymer of Example I filled with the fine kaolin clay (used in Example I) coated with 1% octylamine acetate was studied. The kaolin clay was coated by blending the clay with octylamine acetate and passing the mixture through a fluid energy mill.

The octylamine acetate coated kaolin was added to the prepolymer employed in Example I in the amount of 10%, based on the prepolymer weight. The prepolymer was foamed and treated as in Example I and the properties of the filled foam evaluated. The results are tabulated in Table II.

TABLE II

*Physical Properties of Foams Filled With Coated Kaolin Clay*

| Extender | Density, Lbs./Cu. Ft. | Foam Vol.,Cu. Ft./ Total Formula | p.s.i. 50% Deflection | Percent Compression Set |
|---|---|---|---|---|
| None | 3.29 | 30.4 | 0.50 | 29.5 |
| Fine Kaolin Clay Coated with 10% Octaylamine Acetate | 3.24 | 34.0 | 0.62 | 6.2 |

The resultant foam was a fine, even textured, uniformly open-celled material.

The results tabulated in Table II show that the amine coating on the fine kaolin clay permitted a clay, which normally could not be satisfactorily incorporated in the foam, to extend substantially the volume of foam produced by a given amount of prepolymer. As shown above, to truly extend the foam, the foam volume of the product made with 10 pounds of coated kaolin per 100 pounds of prepolymer would have to exceed the foam volume produced by 100 pounds of prepolymer in absence of filler by at least about 1.20 cu. ft. The use of coated clay, however, increased the foam volume by more than 3.6 cubic feet.

The results of the deflection test appearing in Table I also show that the coated clay increased the rigidity of the foam so as to improve the utility of the foam in crash pads and other applications in which a less flexible foam is required to realize the requisite degree of shock absorbency. By increasing the deflection value of the foam, the shock absorption of a unit volume of foam is increased so that a thinner section of foam will have the shock absorbency comparable to that of a thicker section of a more flexible foam.

A further important advantage of using amine-coated kaolin is also indicated by the compression set value appearing in Table II. The compression set value of the octylamine acetate-coated clay was 6.2%, a substantial improvement over that of the unfilled foam which was 29.5% or that of a foam filled with coarse clay.

It was found that the coarse fractionated kaolin clay of Example I was not similarly benefited by coating with 1% octylamine acetate, insofar as its utility in filling polyurethane foams was concerned, since no appreciable increase in foam volume or compression set value was realized.

EXAMPLE III

This example illustrates the preparation of an amine-coated kaolin filled foamed polyurethane product using castor oil as a reactant.

A prepolymer is prepared as follows:

| | Parts by wt. |
|---|---|
| Nacconate 80 | 1300 |
| Castor oil (C.P. grade) | 1800 |

Both ingredients are mixed in the reaction vessel. When the temperature reaches 185° F., heating is begun and the batch brought to 275° F., continuous agitation being employed throughout the processing. The temperature is held at 275° F. for about one hour at the end of which time the viscosity of the prepolymer should be 40,000 to 70,000 cp. at room temperature.

To 100 parts of prepolymer 15 parts of the fine clay of Example I coated with 2% by weight of n-hexylamine is carefully mixed in to avoid entrainment of air. A catalyst-water wetting agent mixture is prepared by mixing:

| | Parts by wt. |
|---|---|
| Water | 100 |
| Dimethylethanolamine | 45 |
| Triton X100 (alkyl aryl ether alcohol) | 65 |

The prepolymer-coated kaolin clay mixture is warmed to 150° F. to reduce viscosity and to facilitate rapid mixing therein of 7.5 parts of the above catalyst mixture. After introduction of the catalyst mixture, the batch is vigorously agitated for 10 seconds and poured into a mold to foam. The resulting foam is a semirigid type.

EXAMPLE IV

Another formulation for the preparation of an open celled polyurethane foam of my invention is as follows:

| | Parts by wt. |
|---|---|
| Niax Diol PPG 2025 | 75.0 |
| 2,4-tolylenediisocyanate | 25.0 |
| Kaolin clay (av. equiv. spherical diameter 0.55 micron) coated with 2.5% by wt. of dodecylamine acetate in a fluid energy mill | 10.0 |
| Water | 2.3 |
| N-methylmorpholine | 2.0 |
| DC200 | 0.5 |

The foamed composition is prepared by the procedure of Example I.

EXAMPLE V

Still another coated kaolin filled polyurethane composition may be prepared utilizing the procedure of Example I and employing the following materials in which all parts are parts by weight:

| | |
|---|---|
| Niax Diol PPG 2025 | 75.0 |
| 2,4-tolylenediisocyanate | 25.0 |
| Kaolin clay (av. equiv. spherical diameter 0.55 micron) coated with 0.75% by wt. of decylamine by ball milling the mixture | 8.0 |
| Water | 2.3 |
| N-methylmorpholine | 2.0 |
| DC200 | 0.5 |

I claim:

1. An essentially open-celled plastic foam composition comprising the foamed polymerization product of water and tertiary amine catalyst with a liquid polyurethane prepolymer containing free isocyanato groups, said prepolymer being the reaction product of an arylene diisocyanate and a liquid polyalkylene ether polyol having an equivalent weight of at least 200, and from about 5 percent to about 40 percent, based on the weight of said prepolymer, of kaolin clay substantially free from particles coarser than 44 microns and having an average equivalent spherical diameter not greater than 0.80 micron, the particles of which are uniformly coated with from about 0.1 percent to about 4.0 percent by weight of an organic cationic material selected from the group consisting of an alkyl amine containing nitrogen in trivalent state and having a total of from 6 to 22 carbon atoms, mineral acid salts thereof, and alkanoic acid salts thereof wherein the alkyl group contains from 1 to 17 carbon atoms.

2. The composition of claim 1 wherein said cationic material is octylamine acetate.

3. An essentially open-celled plastic foam composition comprising the foamed polymerization product of water and tertiary amine catalyst with a liquid polyurethane prepolymer containing free isocyanato groups, said polyurethane prepolymer being the reaction product of an arylene diisocyanate and at least one long chain linear polyhydroxyl compound selected from the group consisting of a linear polyalkylene ether polyol having an equivalent weight of at least 200, a linear saturated polyester having terminal hydroxyl groups which is the esterification product of a dibasic acid and a dihydric alcohol, and a fatty acid triglyceride having a hydroxyl number of at least 49, and uniformly distributed therein from about 5 percent to about 40 percent, based on the weight of said prepolymer, of kaolin clay substantially free from particles coarser than 44 microns and having an average equivalent spherical diameter less than 0.80 micron, the particles of said kaolin clay being uniformly coated with from 0.1 percent to 4 percent, based on the weight of said clay, of an organic cationic material selected from the group consisting of an alkyl amine containing nitrogen in trivalent state and having a total of from 6 to 22 carbon atoms, mineral acid salts thereof, and alkanoic acid salts thereof wherein the alkyl group contains from 1 to 17 carbon atoms, said foam composition being further characterized by having a volume at least equal to the foam volume normally produced by said prepolymer in the absence of said coated kaolin clay plus the foam volume normally produced by a volume of said prepolymer equivalent to the volume of said coated kaolin clay in the composition.

4. The composition of claim 3 wherein the organic cationic material is a primary n-alkylamine having from 6 to 8 carbon atoms.

5. The composition of claim 3 wherein the organic cationic material is the acetate salt of a primary n-alkylamine having from 6 to 8 carbon atoms.

6. The composition of claim 3 wherein the organic cationic material is octylamine acetate.

7. An essentially open-celled plastic foam composition comprising the foamed polymerization product of water and tertiary amine catalyst with a liquid polyurethane prepolymer containing free isocyanato groups, said polyurethane prepolymer being the reaction product of an arylene diisocyanate and at least one long chain linear polyhydroxyl compound selected from the group consisting of a linear polyalkylene ether polyol having an equivalent weight of at least 200, a linear saturated polyester having terminal hydroxyl groups which is the esterification product of a dibasic acid and a dihydric alcohol, and a fatty acid triglyceride having a hydroxyl number of at least 49, and uniformly distributed therein from about 7.5 percent to about 15.0 percent, based on the weight of said prepolymer of kaolin clay substantially free from particles coarser than 44 microns and having an average equivalent spherical diameter of about 0.55 micron, the particles of said kaolin clay being uniformly coated with from 0.1 percent to 4 percent, based on the weight of said clay, of the acetate salt of a primary n-alkylamine containing nitrogen in trivalent state and having from 6 to 8 carbon atoms in the alkyl group, said foam composition being further characterized by having a volume at least equal to the foam volume normally produced by said prepolymer in the absence of said coated kaolin clay plus the foam volume normally produced by a volume of said prepolymer equivalent to the volume of said coated kaolin clay in the composition.

8. An essentially open-celled plastic foam composition comprising the water-foamed polymerization product of a liquid polyurethane prepolymer containing unreacted isocyanato groups, said prepolymer being the reaction product of an arylene diisocyanate and a liquid linear polyalkylene ether polyol having an equivalent weight of at least about 200, and uniformly distributed therein from about 7.5 percent to 15 percent, based on the weight of said prepolymer, of degritted kaolin clay having a particle size distribution such that not more than 50 percent by weight of the particles thereof are coarser than 0.80 micron, the particles of said kaolin clay being uniformly coated with about 1 percent, based on the weight of said clay, of an organic cationic material selected from the group consisting of alkyl amines containing nitrogen in trivalent state and having a total of from 6 to 22 carbon atoms, mineral acid salts thereof, and alkanoic acid salts thereof wherein the alkyl group contains from 1 to 17 carbon atoms.

9. The composition of claim 8 wherein the organic cationic material is a primary n-alkylamine having from 6 to 8 carbon atoms.

10. The composition of claim 8 wherein the organic cationic material is octylamine acetate.

11. An essentially open-celled plastic foam composition comprising the water-foamed polymerization product of a liquid polyurethane prepolymer containing unreacted isocyanato groups, said prepolymer being the reaction product of an arylene diisocyanate and a liquid linear polyalkylene ether polyol having an equivalent weight of at least 200, and uniformly distributed therein from 5 percent to 40 percent, based on the weight of said prepolymer, of degritted kaolin clay having a particle size distribution such that not more than 50 percent by weight of the particles thereof are coarser than 0.80 micron, the particles of said kaolin clay being uniformly coated with from 0.1 percent to 4 percent, based on the weight of said clay, of an organic cationic material selected from the group consisting of an alkyl amine containing nitrogen in trivalent state and having a total of from 6 to 22 carbon atoms, mineral acid salts thereof, and alkanoic acid salts thereof wherein the alkyl group contains from 1 to 17 carbon atoms, said foam composition being further characterized by having a volume at least equal to the foam volume normally produced by said prepolymer in the absence of said coated kaolin clay plus the foam volume normally produced by a volume of said prepolymer equivalent to the volume of said coated kaolin clay in the composition.

12. In the method for the preparation of a plastic foam which involves the step of mixing a foamable liquid polyurethane prepolymer containing free isocyanato groups with water in the presence of an amine catalyst and reacting the free isocyanato groups with water, said prepolymer being the reaction product of an arylene diisocyanate and at least one substantially linear long chain polyhydroxyl compound selected from the group consisting of a linear polyalkylene ether polyol having an equivalent weight of at least 200, a linear saturated polyester having terminal hydroxyl groups which is the esterification product of a dibasic acid and a dihydric alcohol, and a fatty acid triglyceride having a hydroxyl number of at least 49, the improvement which consists in adding to said liquid polyurethane prepolymer, prior to its reaction with water and catalyst, from 5 percent to 40 percent, based on the weight of said prepolymer, of kaolin clay substantially free from particles coarser than 44 microns and having an average equivalent spherical diameter not greater than 0.80 micron, the particles of which are uniformly coated with from 0.1 percent to 4 percent by weight of an organic cationic material selected from the group consisting of an alkyl amine containing nitrogen in trivalent state and having from 6 to 22 carbon atoms, mineral acid salts thereof, and alkanoic acid salts thereof wherein the alkyl group contains from 1 to 17 carbon atoms.

References Cited in the file of this patent

UNITED STATES PATENTS 2,634,244     Simon et al. _____ Apr. 7, 1953

FOREIGN PATENTS 788,062     Great Britain _____ Dec. 23, 1957